(12) United States Patent
Lecomte et al.

(10) Patent No.: US 10,737,634 B2
(45) Date of Patent: Aug. 11, 2020

(54) PIVOTING INTERNAL DISPLAY UNIT WITH FIXED SCREEN

(71) Applicant: Systems and Software Enterprises, LLC, Brea, CA (US)

(72) Inventors: Romain Claude Andre Lecomte, Brea, CA (US); Brian Andrew Simone, Brea, CA (US); Samuel A. Carswell, Brea, CA (US); Steve B. Sargeant, Brea, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 134 days.

(21) Appl. No.: 15/934,734

(22) Filed: Mar. 23, 2018

(65) Prior Publication Data

US 2018/0272957 A1 Sep. 27, 2018

Related U.S. Application Data

(60) Provisional application No. 62/476,088, filed on Mar. 24, 2017.

(51) Int. Cl.
*B60R 11/02* (2006.01)
*B64D 11/06* (2006.01)
*B64D 11/00* (2006.01)

(52) U.S. Cl.
CPC .... *B60R 11/0235* (2013.01); *B64D 11/00151* (2014.12); *B64D 11/06* (2013.01); *B64D 11/064* (2014.12)

(58) Field of Classification Search
CPC . B64D 11/06; B64D 11/064; B64D 11/00151; B60R 11/0235

USPC ....................................................... 297/217.3
See application file for complete search history.

(56) References Cited

U.S. PATENT DOCUMENTS

| | | | | |
|---|---|---|---|---|
| 5,267,775 | A | * 12/1993 | Nguyen | B60R 11/0235 297/217.3 X |
| 5,507,556 | A | * 4/1996 | Dixon | B60R 11/0235 297/217.3 X |
| 6,822,812 | B1 | 11/2004 | Brauer | |
| 7,597,393 | B1 | 10/2009 | Tuccinardi et al. | |
| 7,857,176 | B2 | 12/2010 | Schedivy | |
| 8,210,605 | B2 | 7/2012 | Hough et al. | |
| 8,308,237 | B2 | 11/2012 | Kunou | |
| 8,777,310 | B2 | 7/2014 | Westerink et al. | |

(Continued)

FOREIGN PATENT DOCUMENTS

| | | |
|---|---|---|
| CA | 2 652 584 | 11/2007 |
| EP | 1 880 903 | 1/2008 |

(Continued)

*Primary Examiner* — Anthony D Barfield
(74) *Attorney, Agent, or Firm* — Ryan Dean; Umberg Zipser LLP

(57) ABSTRACT

Display systems for a vehicle are contemplated that comprise a seat display unit coupled with a display screen, where the display screen is affixed to a seat back and the seat display unit is disposed within the seat back. The display screen is fixed to the seat back such that its relative position with the seat back remains constant when the seat back is reclined. The seat display unit is coupled to the seat back, such that the seat display unit automatically tilts or pivots when the seat back is reclined, and while the display screen does not move relative to the seat back.

10 Claims, 1 Drawing Sheet

(56) References Cited

U.S. PATENT DOCUMENTS

| | | |
|---|---|---|
| 9,016,627 B2 | 4/2015 | Margis et al. |
| 9,432,716 B2 | 8/2016 | Liu |
| 9,788,021 B2 | 10/2017 | Margis et al. |
| 2009/0316057 A1 | 12/2009 | Campbell et al. |
| 2015/0227277 A1 | 8/2015 | Margis et al. |
| 2015/0329209 A1 | 11/2015 | Muirhead |
| 2016/0249073 A1 | 8/2016 | Margis et al. |
| 2017/0305359 A1 | 10/2017 | Rook et al. |
| 2017/0341594 A1 | 11/2017 | Kelly et al. |

FOREIGN PATENT DOCUMENTS

| | | |
|---|---|---|
| EP | 2 923 884 | 9/2016 |
| EP | 3 230 162 | 3/2018 |
| WO | 1990015508 | 12/1990 |
| WO | 2007075461 | 7/2007 |
| WO | 2013036621 | 3/2013 |
| WO | 2016092509 | 12/2016 |

\* cited by examiner

PIVOTING INTERNAL DISPLAY UNIT WITH FIXED SCREEN

This application claims priority to U.S. provisional application having Ser. No. 62/476,088 filed on Mar. 24, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is in-vehicle entertainment systems, and, in particular, display units for use in passenger aircraft or other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Traditionally, seat display units (SDUs) disposed in passenger aircraft and other vehicles require they be manually tilted by passengers when the seat in which they are disposed is reclined by another passenger. Examples of such display units are described in U.S. Pat. Nos. 7,407,227, 8,777,310, and 9,016,627 and Canada patent no. 2652584.

Airlines and seat vendors prefer to eliminate tilting SDUs because the SDUs can pinch passenger fingers, can be ugly, and can be hard to make secure enough to pass force-impact testing that is generally required for the SDUs to be used in an aircraft setting. In addition, seats and SDUs are usually designed separately, which leads to a lesser experience for the passengers and sometimes, an unpleasant visual. Further, the most damaged part of an SDU is its touch screen, and in current devices, airlines typically have to return or replace the entire SDU to have the touch screen replaced.

To eliminate the need to manually tilt the display unit, automatically tilting display units have also been attempted—see, e.g., U.S. Pat. No. 8,308,237. However, such display units utilize electrically driven components to tilt the display, increasing the complexity and number of components and resulting in additional weight and higher likelihood of maintenance requirements.

Another option to avoid the requirement of a manually-tiltable display unit is described in U.S. Pat. No. 6,822,812, which discusses the use of a fixed display unit where the image itself is manipulated to account for seat recline. However, such modification for each seat can require significant computational power leading to the potential for delays or lag time in the video being viewed which could result in a less than desirable experience for passengers.

Thus, there is still a need for providing a display unit that allows for replacement of the touch screen when non-operational, while eliminating the need for manually tilting the touch screen when the seat is reclined.

SUMMARY OF THE INVENTION

The inventive subject matter provides apparatus, systems and methods in which an entertainment system comprises a plurality of seat display units (SDUs) each disposed within a seat back, and a touch screen or other screen that is fixed in position to the seat back and on to which the display unit can project an image or video. In the case of a touch screen, the fixed screen can receive input from a passenger. The SDUs can each be automatically tilted as the seat is reclined, but while the touch or other screen remains fixed in place relative to the seat back surface. Thus, as the seat back is reclined or moved back to an upright position, the relative position of the fixed display screen to the SDU will change. This is shown in the examples illustrated in FIGS. 1A and 1B. Thus, the SDU is automatically tilted when an angle of the seat back changes to ensure that the passenger in the seat facing the touch or other display screen can view the image or video being displayed on the screen without requiring tilting of the screen itself.

Various objects, features, aspects and advantages of the inventive subject matter will become more apparent from the following detailed description of preferred embodiments, along with the accompanying drawing figures.

DETAILED DESCRIPTION

Figures 1A, 1B:
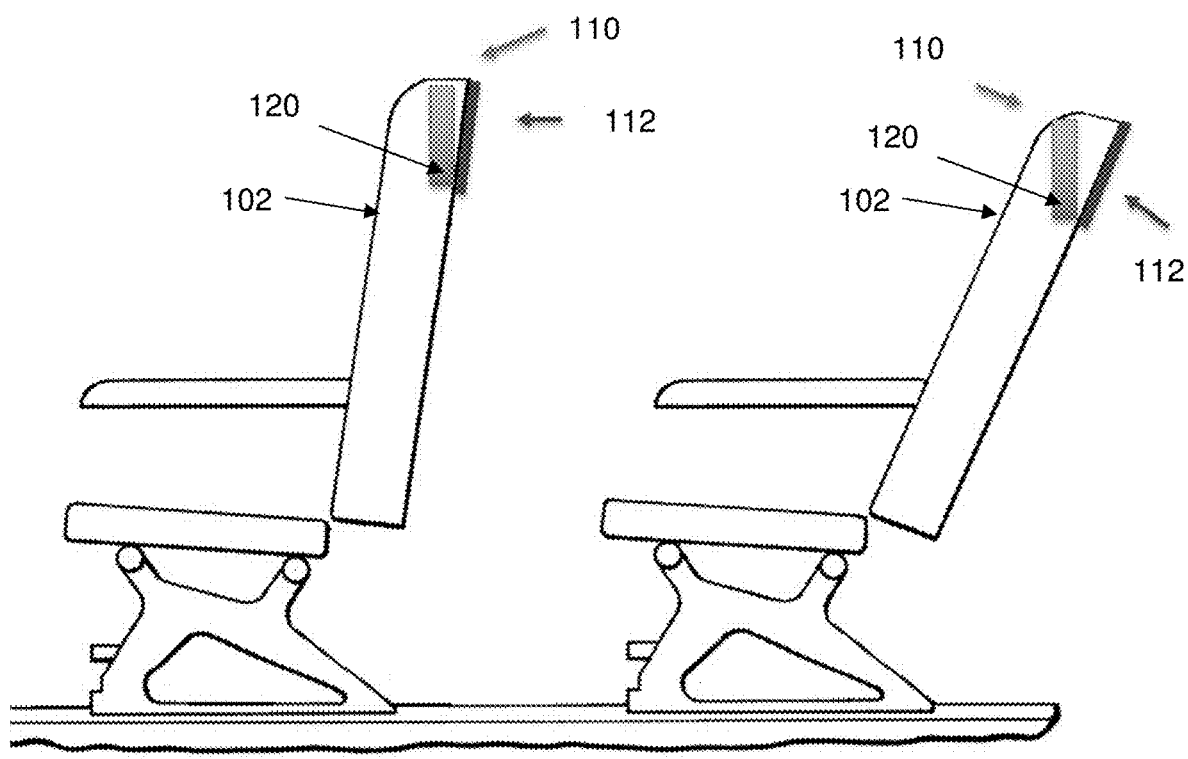
FIG. 1A is an illustration of one embodiment of a display system for a vehicle installed in a seat back that is in an upright position.
FIG. 1B is an illustration of the display system of FIG. 1A in the seat back when reclined.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the systems and methods described herein allow for disparate systems in an aircraft to be communicatively coupled to allow for remote status monitoring and/or control, for example.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

Although the below embodiments discuss the system's use in an aircraft, it is contemplated that the system could be used in other vehicles including, for example, boats, trains, and busses. One should appreciate that the disclosed techniques provide many advantageous technical effects including providing a seat display unit that eliminates the need for manually tilting of the screen, leading to less potential damage to the SDU and the passengers.

In one embodiment of the inventive concept shown in FIGS. 1A-1B, a seat 100 comprises a SDU 110 and a display screen 112, which could be a touch screen or other screen. In such embodiments, preferably all or almost all of the passenger seats in an aircraft or other vehicle comprise a display screen, where a passenger will be seated in the row immediately behind the seat in which the SDU is disposed. Thus, for example, each seat back in row 1 of an aircraft would have a SDU and display screen for the passenger sitting in the seats in row 2 (e.g., seat 1A SDU for passenger in seat 2A, and so forth). The seat 100 shown in FIG. 1A has a seat back 102 in an upright position, with a display screen 112 affixed to the seat back 102, such that the display screen 112 remains in the same position on the seat back 102 when the seat back 102 is reclined or moved to an upright position. Put another way, a plane of the display screen 112 has the same angle relative to a plane of the seat back 102 when the seat back 102 is reclined or in an upright position.

As shown in FIG. 1B, when the seat back 102 is tilted, the SDU 110 itself can be automatically tilted with respect to the seat back 102 to ensure the passenger maintains a good viewing angle when the seat back 102 is reclined. In such embodiment, no manual tilting of the display screen 112 or SDU 110 is required or permitted by the passenger, resulting in less potential damage to the SDU 110 and the passengers. This is because the display screen 112 is affixed to the seat back 102 and therefore fixed in position.

As shown in FIGS. 1A-1B, the display screen 112 is fixed with seat back movement, such that a position and angle of the display screen 112 relative to the seat back 102 is maintained. Advantageously, the display screen 112 can be independently replaceable by the maintenance crew, meaning it can be replaced without requiring replacement of the associated SDU 110, and instead of returning a SDU with a built-in display screen for repair. This advantageously can result in quick repair or replacement of a display screen 112 when malfunctioning, such as between flights.

Because the display screen 112 is separable from the SDU 110 and fixed in place, an edge to edge display screen can be used (e.g., left to right edges of seat back), which can also improve the aesthetic quality of the seats and allow for larger display screens to be used. In addition, elimination of a tiltable display screen/SDU can lead to reduced weight and thickness of each seat.

In some contemplated embodiments, the seat display unit 110 comprises a pivot point 120 at a bottom portion of the seat display unit 110 at which the seat display unit 110 is coupled to the seat back 102 or a frame within the seat back 102, such that when the seat back 102 is reclined, the bottom portion of the seat display unit 110 remains at the pivot point 120 while the top portion of the seat display unit rotates (compared position of seat display unit 110 within seat back in FIG. 1A versus FIG. 1B).

It is also contemplated that the display screen 112 can be coupled to the seat back 102 via a first set of fasteners, and the seat display unit 110 can be coupled to the seat back 102 or a frame within the seat back 102 via a second set of fasteners that is distinct from the first set.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A display system for a vehicle, comprising:
    a seat display unit disposed within a seat having a seat back in a vehicle;
    a display screen communicatively coupled with the seat display unit, wherein the display screen is affixed to the seat back, such that the display screen maintains a fixed position and does not tilt or move relative to the seat back when the seat is reclined;
    wherein the display unit is configured to project or present content on the display screen; and
    wherein the seat display unit is mounted within the seat such that the seat display unit is configured to (i) automatically tilt and (ii) change its position relative to the seat, when the seat is reclined.

2. The display system of claim 1, wherein the display screen is separable from the seat display unit and is removably affixed to the seat back, such that the display screen can be removed from the seat back without removing the seat display unit.

3. The display screen of claim 1, wherein the display screen is sized to extend from a first edge of the seat back to a second edge of the seat back.

4. The display screen of claim 1, wherein the seat display unit comprises a pivot point at a bottom portion of the seat display unit at which the seat display unit is coupled to the seat back or a frame within the seat back, such that when the seat back is reclined, the bottom portion of the seat display unit remains at the pivot point while the top portion of the seat display unit rotates.

5. The display screen of claim 1, wherein the display screen is coupled to the seat back via a first set of fasteners, and wherein the seat display unit is coupled to the seat back or a frame within the seat back via a second set of fasteners that is distinct from the first set.

6. An in-vehicle display system, comprising:
    a plurality of seat display units, each of which is disposed within a seat having a seat back, wherein each of the plurality of seat display units is coupled with a display screen that is affixed to the seat back of the eat where the seat display unit is placed;
    wherein each display screen is fixed in place relative to the seat back to which the display screen is mounted and maintains a fixed position and angle relative to the seat back when the seat is reclined; and
    wherein each of the seat display units is configured to automatically tilt within the seat where it is disposed as the seat is reclined.

7. The display system of claim 6, wherein each display screen is separable from the seat display unit and is removably affixed to a seat back, such that the display screen can be removed from the seat back without requiring removal of the seat display unit from the seat back.

8. The display screen of claim 6, wherein each display screen is sized to extend from a first edge of the seat back where it is affixed to a second opposing edge of the seat back.

9. The display screen of claim 6, wherein each seat display unit comprises a pivot point at a bottom portion of the seat display unit at which the seat display unit is coupled to the seat back or a frame within the seat back, such that when the seat back is reclined, the bottom portion of the seat display unit remains at the pivot point while the top portion of the seat display unit rotates.

10. The display screen of claim 6, wherein the display screen is coupled to the seat back via a first set of fasteners, and wherein the seat display unit is coupled to the seat back or a frame within the seat back via a second set of fasteners that is distinct from the first set.

* * * * *